(12) United States Patent
Gao et al.

(10) Patent No.: US 8,934,566 B1
(45) Date of Patent: Jan. 13, 2015

(54) CHANNEL ESTIMATION METHOD

(71) Applicant: Beihang University, Beijing (CN)

(72) Inventors: Qiang Gao, Beijing (CN); Youguang Zhang, Beijing (CN); Weijie Xiao, Beijing (CN); Jun Zhang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 14/060,611

(22) Filed: Oct. 22, 2013

(51) Int. Cl.
*H04B 7/02* (2006.01)
*H04L 1/02* (2006.01)
*H04L 25/02* (2006.01)
*H04L 27/26* (2006.01)

(52) U.S. Cl.
CPC ........ *H04L 25/0242* (2013.01); *H04L 27/2601* (2013.01)
USPC ............ 375/267; 375/260; 370/203; 370/208

(58) Field of Classification Search
CPC H04L 5/0023; H04L 25/0202; H04B 7/0413; H04B 17/0042
USPC .......... 375/260, 267, 295, 347; 370/203–211
See application file for complete search history.

(56) References Cited

U.S. PATENT DOCUMENTS

2010/0322080 A1* 12/2010 Sung et al. .................... 370/242

* cited by examiner

*Primary Examiner* — Curtis Odom

(57) ABSTRACT

The present invention provides a channel estimation method for a MIMO (Multiple-Input Multiple-Output) antenna system comprising two transmit antennas and two receive antennas. The method performs a preliminary estimation on a channel, and then calculates to obtain a calculated value for the transmitted signal by using the estimated channel value. The calculated value for the transmitted signal is reconstructed, the reconstructed calculated value is used as the transmitted signal, and the channel value is estimated for a second time. The iteration is performed in this manner for n times, leading to a more accurate channel value. The method of the invention has a high efficiency, and the channel value is accurately estimated.

13 Claims, 3 Drawing Sheets

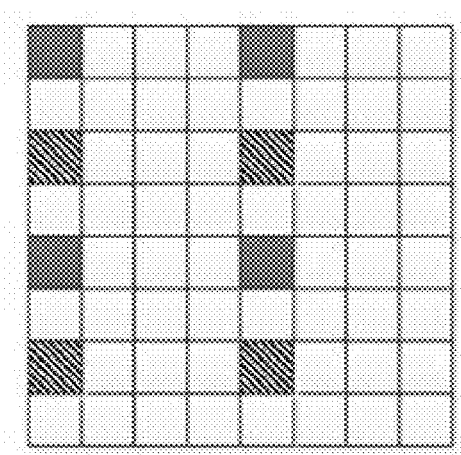
FIG. 3A
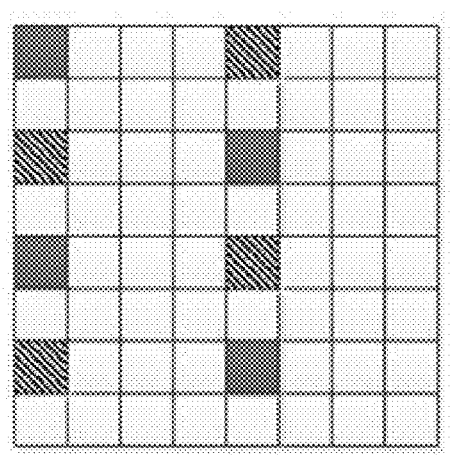
FIG. 3B
 pilot signal for transmit antenna 0
 pilot signal for transmit antenna 1

CHANNEL ESTIMATION METHOD

BACKGROUND OF THE INVENTION

1. Field of the Invention

The present invention relates to the filed of communication technology, and particularly to a channel estimation method between a transmitted signal and a received signal.

2. Background of the Invention

The channel estimating technology is a key issue in a MIMO-OFDM (Orthogonal Frequency Division Multiplexing) system. Channel estimating refers to a process in which the receiver estimates the distortion in the spatially multiplexed signal on a plurality of antennas. In other words, in an antenna-based transceiver system, one can only obtain the real received signal, and then the real transmitted signal is detected by the received signal along with the channel value. The accuracy of the estimated channel value determines the accuracy of the estimated real transmitted signal. In a MIMO (Multiple-Input Multiple-Output) system, due to the interference among the transmitted signals, deviations and errors tend to arise during the process of restoring the transmitted signal from the received signal along with the channel value. Therefore, it is of vital importance to accurately estimate the channel value in the MIMO system.

In the existing channel estimating technology, generally only the one-way information from the received signal is considered, and the information in the determining result is not considered, which makes it impossible to produce a more accurate channel estimating result.

BRIEF SUMMARY OF THE INVENTION

In order to overcome the drawbacks in the prior art, the present invention provides a channel estimation method to produce a more accurate channel estimating result.

The technical solution of the present invention lies in a channel estimation method for a MIMO (Multiple-Input Multiple-Output) antenna system comprising two transmit antennas and two receive antennas, the method comprising:

1) OFDM demodulating the received signal to obtain all resource elements of the received signal, mixing at least one pilot signals into the resource elements, and mapping all resource elements and said at least one pilot signals onto a time-frequency two-dimensional plane;

2) according to the transmitted signals on two transmit antennas and the received signals on two receive antennas for each pilot signal, calculating preliminarily estimated channel values for all resource elements;

3) selecting two resource elements as a pair of resource elements based on a predetermined rule to obtain multiple pairs of resource elements;

4) for each pair of resource elements, based on the preliminarily estimated channel value for each resource element in the pair of resource elements, detecting the transmitted signal of each resource element in the pair of resource elements;

5) reconstructing the format of the transmitted signal obtained in step 4), calculating the channel value for each resource element by using the reconstructed transmitted signal and the received signal, and converting the calculated channel value for the resource element obtained in this step into a combined channel value;

6) replacing the channel value in step 4) with the combined channel value obtained in step 5), repeating step 4) and step 5), continuously performing the iterative calculation for n times, where n is a natural number, and taking the calculated channel value obtained in the $n^{th}$ time iterative calculation as the final estimated channel value.

Preferably, in the channel estimation method, in step 1) said resource elements are mixed with a plurality of pilot signals, the number of pilot signals is proportional to the number of resource elements, and the pilot signals are uniformly distributed in a time-frequency two-dimensional plane.

Preferably, in the channel estimation method, in said time-frequency two-dimensional plane in step 1), the horizontal axis is a time domain indicating a time sequence, the vertical axis is a frequency domain indicating a frequency sequence, each resource element occupies a coordinate point, and each pilot signal also occupies a coordinate point.

Preferably, in the channel estimation method, calculating preliminarily estimated channel values for all resource elements in step 2) is achieved by a time-frequency two-dimensional interpolation algorithm, and the preliminarily estimated channel value for each resource element is derived from the adjacent pilot signals.

Preferably, in the channel estimation method, the predetermined rule in step 3) is as follows:

two resource elements in the pair of resource elements should be located at two neighboring symbols in the time domain;

two resource elements in the pair of resource elements should be located at the same sub-carrier in the frequency domain; and two resource elements in the pair of resource elements should not be located at the coordinate point for carrying the pilot frequency.

Preferably, in the channel estimation method, in case the three conditions about the structure of the transmitted signal are satisfied, a resource element belongs to one or two pairs of resource elements, and as many pairs of resource elements as possible are selected.

Preferably, in the channel estimation method, obtaining the calculated value for the transmitted signal of each resource element in the pair of resource elements in step 5) is preformed in the following manner:

assuming that two resource elements in the pair of resource elements are a resource element A and a resource element B, the received signal on the receive antenna with a port number of 0 for the resource element A is $y_0$, the received signal on the receive antenna with a port number of 1 for the resource element A is $y_1$, the received signal on the receive antenna with a port number of 0 for the resource element B is $y_2$, the received signal on the receive antenna with a port number of 1 for the resource element B is $y_3$;

the transmitted signal on the transmit antenna with a port number of 0 for the resource element A is $S_0$, the transmitted signal on the transmit antenna with a port number of 1 for the resource element A is $S_1$, the transmitted signal on the transmit antenna with a port number of 0 for the resource element B is $S_2$, the transmitted signal on the transmit antenna with a port number of 1 for the resource element B is $S_3$, channel values for the resource element A and the resource element B are deemed identical and denoted as $H_{i,j}$, i, j∈{0, 1}, where i, j represent the port number of the transmit antenna and the port number of the receive antenna respectively;

the equation for estimating channel values is as follows:

$$\begin{bmatrix} y_0 \\ y_1 \\ y_2 \\ y_3 \end{bmatrix} = \begin{bmatrix} s_0 & s_1 & 0 & 0 \\ 0 & 0 & s_0 & s_1 \\ s_2 & s_3 & 0 & 0 \\ 0 & 0 & s_2 & s_3 \end{bmatrix} \begin{bmatrix} H_{00} \\ H_{10} \\ H_{01} \\ H_{11} \end{bmatrix}.$$

Preferably, in the channel estimation method, reconstructing the format of the transmitted signal in step 5) is preformed in the following manner: performing de-precoding, demodulating, and channel decoding on the transmitted signal sequentially to obtain the information source, and then performing channel coding, modulating, and pre-coding on the information source sequentially to finally obtain the reconstructed transmitted signal.

Preferably, in the channel estimation method, calculating the channel value for the resource element in step 5) is to calculate by substituting the reconstructed transmitted signal and the received signal into the equation for estimating channel values.

Preferably, in the channel estimation method, if the equation for estimating channel values with respect to channel values for the resource elements in a pair of resource elements is unsolvable, the channel values on the pair of resource elements are temporarily denoted as N/A.

Preferably, in the channel estimation method, during repeating step 5), the previously obtained combined channel value is replaced successively by the currently obtained combined channel value, and only the combined channel value obtained in the last time is saved.

Preferably, in the channel estimation method, the method for converting the calculated channel value for the resource element into a combined channel value in step 5) is as follows:

traversing all resource elements of the transmitted signal, determining which one or two pairs of resource elements each resource element belongs to, and calculating the combined channel value on each resource element in the following five situations:

if the resource element belongs to two different pairs of resource elements, and if, when channel values for the resource element are solved by applying the equation for estimating channel values to these two pairs of resource elements respectively, neither of channel values for the resource element is N/A, the average of the solved values is taken as the combined channel value for the resource element;

if the resource element belongs to two different pairs of resource elements, and if, when channel values for the resource element are solved by applying the equation for estimating channel values to these two pairs of resource elements respectively, one of channel values for the resource element is N/A and the other is not N/A, the channel value which is not N/A is taken as the combined channel value for the resource element;

if the resource element belongs to two different pairs of resource elements, and if, when channel values for the resource element are solved by applying the equation for estimating channel values to these two pairs of resource elements respectively, both channel values for the resource element are N/A, the combined channel value obtained in the previous round is taken as the combined channel value for the resource element;

if the resource element belongs to a pair of resource elements, and if, when channel values for the resource element are solved by applying the equation for estimating channel values to the pair of resource elements, the channel value for the resource element is N/A, the combined channel value obtained in the previous round is taken as the combined channel value for the resource element;

if the resource element belongs to a pair of resource elements, and if, when channel values for the resource element are solved by applying the equation for estimating channel values to the pair of resource elements, the channel value for the resource element is not N/A, the solved channel value is taken as the combined channel value for the resource element.

Preferably, in the channel estimation method, said plurality of pilot signals are generated pseudo randomly in accordance with the structure of the transmitted signal, each pilot signal has a pilot frequency pattern and a pilot frequency magnitude, where the pilot frequency pattern is the position distribution of the pilot signal in the time-frequency two-dimensional plane, the pilot frequency magnitude is the complex symbol magnitude of the pilot signal.

As compared with the prior art, the method of the present invention at least has the following advantages. The pilot frequency pattern and the pilot frequency magnitude can be set in advance according to the structure of the transmitted signal, so that the device and method of the present invention is compatible with any MIMO-OFDM system which applies the pilot frequency. While channel value estimation is performed on the resource element in the received signal, not only the information from the received signal, but also the feedback result of determining the transmitted signal from the received signal, are utilized for repeating the iterative calculations, thus significantly increasing the accuracy for channel estimating.

BRIEF DESCRIPTION OF THE DRAWINGS

FIGS. 3A-3B illustrate two pattern examples of the pilot signal in a time-frequency two-dimensional plan view according to the invention.

DETAILED DESCRIPTION OF THE INVENTION

The technical solutions of the invention will be described comprehensively hereinafter with reference to the accompanying drawings.

Figure 1:
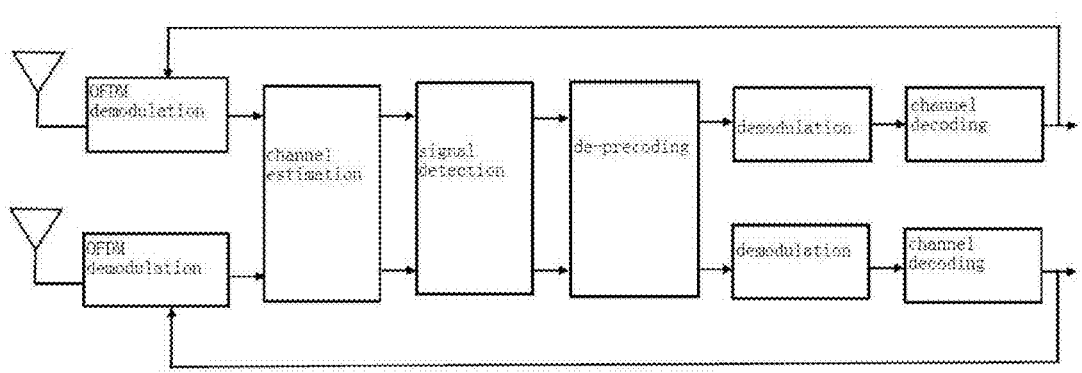
FIG. 1 is a schematic view illustrating channel value estimation performed by the method according to the invention, in which emphasis is placed on the manner of reconstructing the transmitted signal.

In FIG. 1, it is described how to conduct the channel value estimation in a 2×2 transceiver system (i.e., a transceiver system comprising two transmit antennas and two receive antennas). In such a system, the two transmit antennas transmit signals simultaneously, while each of the two receive antennas receives signals transmitted by the two transmit antennas. Firstly, OFDM demodulation is performed on the two received signals, In FIG. 1, the upper and lower processing circuits process the two received signals respectively. Upon demodulating, the resource elements for these two received signals are obtained. The resource element is the minimum resolution unit of the received signal. Each resource element results from interference between two received signals. The channel estimating is performed on each resource element, and finally each resource element corresponds to a channel estimated value. Therefore, the channel value is a quantity which varies with the transmit time, and it is required to estimate (or calculate) the channel value for each time the signal is transmitted. Some pilot signals are mixed in resource elements of the received signal. The pilot signal is a transmitted signal which is designed in advance and has a definite pattern and magnitude. Therefore, based on difference of the pilot signal in the transmit end and the pilot signal in the receive end, it is possible to preliminarily estimate the channel value for each resource element in the transmitted signal. As shown in FIG. 1, the received signal is OFDM demodulated to obtain the resource element. Then, signal detection is performed based on the preliminarily estimated channel value, so as to obtain the transmitted signal.

There are many methods for signal detection in the prior art. For example, a ML (Maximum Likelihood) algorithm may be used for signal detection. De-precoding, demodulating, and channel decoding are performed on the detected transmitted signal sequentially to obtain the information source. Then, channel coding, modulating, and pre-coding are conversely performed on the information source, to obtain a reconstructed transmitted signal. The reconstructed transmitted signal is not really transmitted again, but is transmitted in a virtual manner, so that the calculation for channel estimating is performed for a second time to obtain a new channel value. Then, signal detection is performed again based on the new channel value, the detected transmitted signal is reconstructed again. This process is repeated until the virtual transmission for the $n^{th}$ reconstructed transmitted signal. Herein, n may not only be a pre-set number of times, but also a value which meets certain conditions. With such continuously iterative calculations, a more accurate channel value can finally be obtained.

In the MIMO system, a transmit end performs channel coding, constellation modulating, pre-coding, and OFDM modulating on the transmitted signal sequentially, while a receive end performs OFDM demodulation, signal detecting, de-precoding, and channel decoding on the received signal sequentially. These two processes are inverse with respect to each other. For example, if the channel decoding in the receive end is to decode a Turbo code interleaved at ⅓ code rate, the channel coding module follows a coding rule for the Turbo code interleaved at ⅓ code rate. If signal detection in the receive end is to detect a 16QAM complex signal, the constellation modulating module adopts a 16QAM modulating rule. If the de-precoding module in the receive end is to decode the pre-coding in an open-loop MIMO mode, the pre-coding module adopts a pre-coding rule in the open-loop MIMO mode. If the OFDM demodulation module in the receiver is to decode the OFDM modulation with a short CP as specified in the 3GPPTS36.211 standard (256 sub-carriers, each time slot containing 7 symbols), the OFDM modulating module adopts the OFDM modulating rule with a short CP as specified in the 3GPPTS36.211 standard (256 sub-carriers, each time slot containing 7 symbols).

Figure 2:
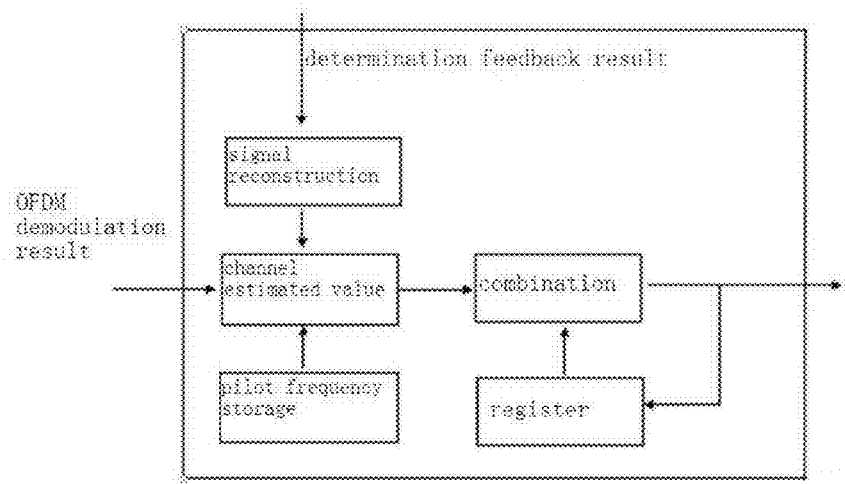
FIG. 2 is a schematic view illustrating channel value estimation performed by the method of the present invention.

Reference is made to FIG. 2, which illustrates in detail the operation process of the invention. The channel estimation method of the invention is directed to a MIMO antenna system which comprises two transmit antennas and two receive antennas. Firstly, OFDM demodulation is performed on the transmitted signal which has been subject to channel coding, constellation modulating, and pre-coding, to obtain all resource elements of the transmitted signal. At least one pilot signals are mixed into the resource elements, and all resource elements together with the at least one pilot signals are mapped onto a time-frequency two-dimensional plane, as shown in FIGS. 3A-3B. In FIGS. 3A-3B, the solid block represents the pilot signal on a transmit antenna, the slash block represents the pilot signal on another transmit antenna, and the remaining blank areas represent resource elements. Of course, the coordinate point in the time-frequency two-dimensional plane sometimes is occupied by the resource element and the pilot signal at the same time. In FIGS. 3A-3B, the horizontal axis represents the time domain, while the vertical axis represents the frequency domain. In FIG. 3A, there are 4 pilot signals on the transmit antenna with a port number of 0, the two pilot signals in the top have a same frequency domain but different time domains, while the two pilot signals in the middle also have a same frequency domain bu different time domains. This is also the case for the pilot signals on the transmit antenna with a port number of 1. In FIG. 3B, there are also 4 pilot signals on the transmit antenna with a port number of 0, the two pilot signals in the left have a same time domain bu different frequency domains, while the two pilot signals in the middle also have a same time domain bu different frequency domains. This also applies for the pilot signals on the transmit antenna with a port number of 1. Besides, the frequency domain signals are uniformly distributed over the whole time-frequency two-dimensional plane, so that it is possible to estimate the preliminarily estimated channel values for all resource elements more accurately. The resource elements, which are close in term of frequency domain and time domain, have similar channel values. Thus we may assume that the channel value for a resource element near a pilot signal is identical to the channel value for this pilot signal. Therefore, by uniformly distributing a plurality of pilot signals over the whole time-frequency two-dimensional plane, it is possible to accurately calculate channel values for resource elements around these pilot signals. As for a resource element which not adjoins the pilot signals, the channel value for the pilot signal around the resource element may be specified as the channel value for the resource element. This method is also referred to as a time-frequency two-dimensional interpolation. What is illustrated in FIGS. 3A-3B is exemplary in nature. The pilot signals of the invention may be generated pseudo randomly on the premise that certain rule is met (e.g., in case of a large number of resource elements, more pilot signals may be generated; in another case, pilot signals which are discrete in term of time domain and frequency domain may be generated). Therefore, it is not intended to limit the form of the pilot signals in any manner.

Then, according to the transmitted signals on two transmit antennas and the received signals on two receive antennas for each pilot signal, preliminarily estimated channel values for all resource elements are calculated. It is a role for the pilot signals to generate a preliminarily estimated channel value for each resource element, which serves as a basis for the following iterative calculation.

Then, two resource elements are selected as a pair of resource elements based on a predetermined rule to obtain multiple pairs of resource elements. For each pair of resource elements, based on the preliminarily estimated channel value for each resource element in the pair of resource elements and the received signal, the transmitted signal of each resource element in the pair of resource elements is calculated. In this way, the first round of detected transmitted signal (which may be referred to as the first round of channel value) is obtained according to the preliminarily estimated channel value from the pilot signal. In the prior art, the task of estimating the transmitted signal is completed by now. The first round of detected transmitted signal is taken as the finally determined transmitted signal in the prior art. However, this is not accurate enough. In the present invention, a more accurate detection is achieved over the prior art.

Then, the first round of detected transmitted signal is reconstructed into the format of the transmitted signal (i.e., the second round of transmitted signal). The channel value for the resource element is calculated by using the reconstructed transmitted signal and the received signal, and the calculated channel value for the resource element obtained in this step is converted into a combined channel value. In other words, in the present invention, de-precoding, demodulating, and channel decoding are performed on the first round of detected transmitted signal sequentially to form the information source, and channel coding, modulating, and pre-coding are performed sequentially to reconstruct a new transmitted signal. During reconstructing, it is possible to correct some errors in decoding, and obtain a transmitted signal which is not exactly identical to and more accurate than the first round of estimated transmitted signal. The reconstructed transmitted signal is referred to as the second round of transmitted signal. The second round of transmitted signal is not really transmitted, but used for iterative calculations. That is, the channel value is calculated again by using the second round of transmitted signal and the received signal. The channel value calculated in this time is referred to as the second round of channel value. The second round of channel value is more accurate than the preliminarily estimated channel value. The above steps are repeated. That is, signal detection is again performed on the received signal by using the new channel value, and the detected transmitted signal is reconstructed again, and thus the third round of transmitted signal is obtained. This is repeated until n rounds of iterations are performed.

That is, the channel value in step 4) is replaced with the combined channel value obtained in step 5), step 4) and step 5) are repeated, the iterative calculation are continuously performed for n times, where n is a natural number, and the calculated channel value obtained in the $n^{th}$ time iterative calculation is taken as the final estimated channel value.

The following conditions should be met during selecting the pair of resource elements:

two resource elements in the pair of resource elements should be located at two neighboring symbols in the time domain;

two resource elements in the pair of resource elements should be located at the same sub-carrier in the frequency domain; and two resource elements in the pair of resource elements should not be located at the coordinate point for carrying the pilot frequency.

Figure 4:
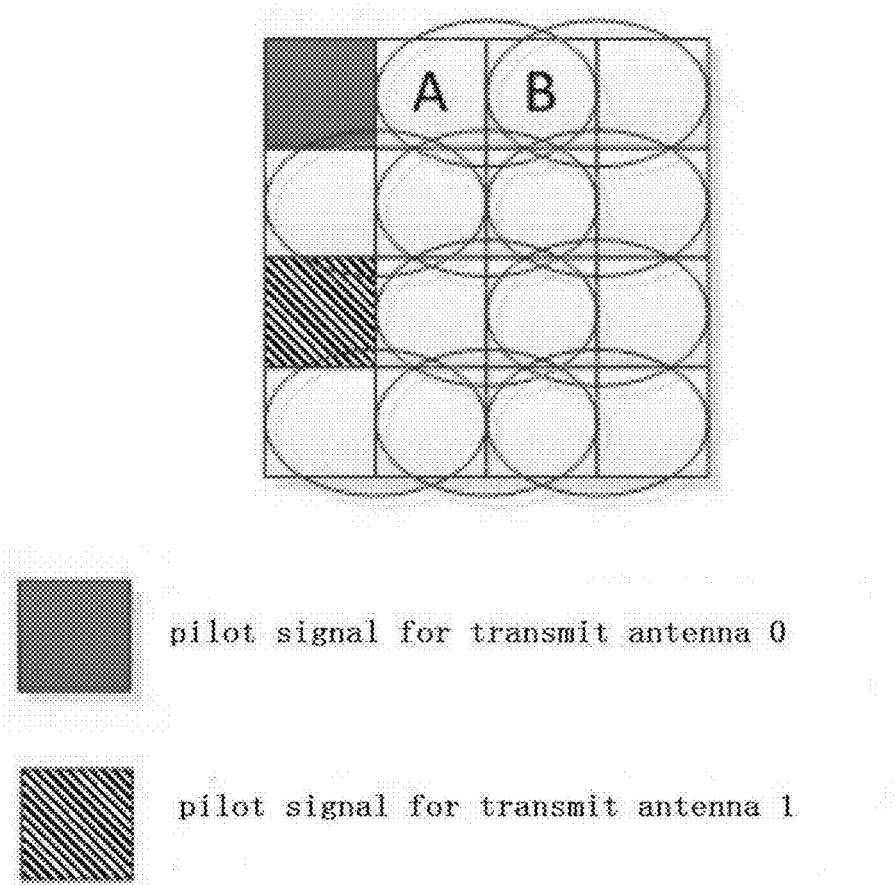
FIG. 4 illustrates the manner for selecting a pair of resource elements in a time-frequency two-dimensional plan view according to the invention.

Reference is made to FIG. 4, illustrating all pairs of resource elements that can be selected according to the pilot signal distribution pattern of FIG. 3A. In FIG. 4, the ellipses indicate all pair of resource elements to be selected). A resource element may belong to multiple pairs of resource elements, and as many pairs of resource elements as possible are selected. However, under the limitation of the above conditions, each resource element can only constitute a pair of resource elements with the left or right neighboring resource element. Therefore, each resource element can belong to a pair of resource elements, and at most can belong to two pairs of resource elements.

Then, all pairs of resource elements are traversed, and channel estimated values for each pair of resource elements are calculated respectively. By taking the pair of resource elements which cover two resource elements A, B in FIG. 4 as an example, obtaining the calculated value for the transmitted signal of each resource element in the pair of resource elements is preformed in the following manner:

assuming that two resource elements in the pair of resource elements are the resource element A and the resource element B, the received signal on the receive antenna with a port number of 0 for the resource element A is $y_0$, the received signal on the receive antenna with a port number of 1 for the resource element A is $y_1$, the received signal on the receive antenna with a port number of 0 for the resource element B is $y_2$, the received signal on the receive antenna with a port number of 1 for the resource element B is $y_3$;

the transmitted signal on the transmit antenna with a port number of 0 for the resource element A is $S_0$, the transmitted signal on the transmit antenna with a port number of 1 for the resource element A is $S_1$, the transmitted signal on the transmit antenna with a port number of 0 for the resource element B is $S_2$, the transmitted signal on the transmit antenna with a port number of 1 for the resource element B is $S_3$, channel values for the resource element A and the resource element B are deemed identical, denoted as $H_{i,j}$, i, j ∈ {0, 1}, where i, j represent the port number of the transmit antenna and the port number of the receive antenna respectively;

the equation for estimating channel values is as follows:

$$\begin{bmatrix} y_0 \\ y_1 \\ y_2 \\ y_3 \end{bmatrix} = \begin{bmatrix} s_0 & s_1 & 0 & 0 \\ 0 & 0 & s_0 & s_1 \\ s_2 & s_3 & 0 & 0 \\ 0 & 0 & s_2 & s_3 \end{bmatrix} \begin{bmatrix} H_{00} \\ H_{10} \\ H_{01} \\ H_{11} \end{bmatrix}.$$

The channel values on the pair of resource elements can be obtained by solving this matrix equation, namely $$H = S^{-1} Y.$$

If this equation is unsolvable, the channel values on the pair of resource elements are temporarily denoted as N/A.

Then, depending on whether the resource element belongs to one or two pairs of resource elements, the final channel value for the resource element is determined. This mainly aims to solve the problem of how to determine the channel value for the resource element, in case two channel values may be obtained when a resource element belongs to two pairs of resource elements, and the problem of how to determine the channel value for the resource element in case the equation for estimating channel values is unsolvable. The final channel value is referred to as a combined channel value. The method for combining channel values is as follows:

traversing all resource elements of the transmitted signal, determining which one or two pairs of resource elements each resource element belongs to, and calculating the combined channel value on each resource element in the following five situations:

if the resource element belongs to two different pairs of resource elements, and if, when channel values for the resource element are solved by applying the equation for estimating channel values to these two pairs of resource elements respectively, neither of channel values for the resource element is N/A, the average of the solved values is taken as the combined channel value for the resource element;

if the resource element belongs to two different pairs of resource elements, and if, when channel values for the resource element are solved by applying the equation for estimating channel values to these two pairs of resource elements respectively, one of channel values for the resource element is N/A and the other is not N/A, the channel value which is not N/A is taken as the combined channel value for the resource element;

if the resource element belongs to two different pairs of resource elements, and if, when channel values for the resource element are solved by applying the equation for estimating channel values to these two pairs of resource elements respectively, both channel values for the resource element are N/A, the combined channel value obtained in the previous round is taken as the combined channel value for the resource element;

if the resource element belongs to a pair of resource elements, and if, when channel values for the resource element are solved by applying the equation for estimating channel values to the pair of resource elements, the channel value for the resource element is N/A, the combined channel value obtained in the previous round is taken as the combined channel value for the resource element;

if the resource element belongs to a pair of resource elements, and if, when channel values for the resource element are solved by applying the equation for estimating channel values to the pair of resource elements, the channel value for the resource element is not N/A, the solved channel value is taken as the combined channel value for the resource element.

It should be noted that from the above description of various embodiments, the skilled in the art can expressly understand that the present invention can not only be implemented by software along with an essential general hardware platform, but also by hardware, and that in most case, the former is preferred. Based on this, the technical solution of the invention essentially, or those portions of the invention which contribute to the prior art, can be embodied by a software product. The software product may be stored in a storage medium, and may comprise several instructions for causing a computing device (e.g., a personal computer, a server, or a network device) to execute the method according to various embodiments of the present invention.

It is appreciated by the skilled in the art that the drawings only show schematic views of a preferred embodiment, and the blocks or process in the drawings are not necessary for implementing the present invention.

Several specific embodiments of the present invention have been described above, but the present invention is by no way limited to these embodiments, and variations and modifications which may occur to the skilled in the art should fall within the scope of the present invention.

The invention claimed is:

1. A channel estimation method for a MIMO antenna system comprising two transmit antennas and two receive antennas, the method comprising steps of:
   1) OFDM demodulating the received signal to obtain all resource elements of a received signal, mixing at least one pilot signal into the resource elements, and mapping all resource elements and said at least one pilot signal onto a time-frequency two-dimensional plane;
   2) according to transmitted signals on the two transmit antennas and the received signals on two receive antennas for each pilot signal, calculating preliminarily estimated channel values for all resource elements;
   3) selecting two resource elements as a pair of resource elements based on a predetermined rule to obtain multiple pairs of resource elements;
   4) for each pair of resource elements, detecting the transmitted signal of each resource element in the pair of resource elements, based on the preliminarily estimated channel value for each resource element in the pair of resource elements;
   5) reconstructing the format of the transmitted signal obtained in step 4), calculating the channel value for each resource element by using the reconstructed transmitted signal and the received signal, and converting the calculated channel value for the resource element obtained in this step into a combined channel value;
   6) replacing the channel value in step 4) with the combined channel value obtained in step 5), repeating step 4) and step 5), continuously performing the iterative calculation for n times, where n is a natural number, and taking the calculated channel value obtained in the $n^{th}$ time iterative calculation as the final estimated channel value.

2. The channel estimation method of claim 1, wherein in step 1) said resource elements are mixed with a plurality of pilot signals, the number of pilot signals is proportional to the number of resource elements, and the pilot signals are uniformly distributed in a time-frequency two-dimensional plane.

3. The channel estimation method of claim 2, wherein in said time-frequency two-dimensional plane in step 1), the horizontal axis is a time domain indicating a time sequence, the vertical axis is a frequency domain indicating a frequency sequence, each resource element occupies a coordinate point, and each pilot signal also occupies a coordinate point.

4. The channel estimation method of claim 3, wherein calculating preliminarily estimated channel values for all resource elements in step 2) is achieved by a time-frequency two-dimensional interpolation algorithm, and the preliminarily estimated channel value for each resource element is derived from the adjacent pilot signals.

5. The channel estimation method of claim 4, wherein the predetermined rule in step 3) is as follows:
   two resource elements in the pair of resource elements should be located at two neighboring symbols in the time domain;
   two resource elements in the pair of resource elements should be located at the same sub-carrier in the frequency domain; and
   two resource elements in the pair of resource elements should not be located at the coordinate point for carrying the pilot frequency.

6. The channel estimation method of claim 5, wherein in case the three conditions of the predetermined rule are satisfied, the resource element can belong to one or two pairs of resource elements, and as many pairs of resource elements as possible are selected.

7. The channel estimation method of claim 6, wherein obtaining the calculated value for the transmitted signal of each resource element in the pair of resource elements in step 5) is preformed in the following manner:
   assuming that two resource elements in the pair of resource elements are a resource element A and a resource element B,
   the received signal on the receive antenna with a port number of 0 for the resource element A is $y_0$, the received signal on the receive antenna with a port number of 1 for the resource element A is $y_1$, the received signal on the receive antenna with a port number of 0 for the resource element B is $y_2$, the received signal on the receive antenna with a port number of 1 for the resource element B is $y_3$;
   the transmitted signal on the transmit antenna with a port number of 0 for the resource element A is $S_0$, the transmitted signal on the transmit antenna with a port number of 1 for the resource element A is $S_1$, the transmitted signal on the transmit antenna with a port number of 0 for the resource element B is $S_2$, the transmitted signal on the transmit antenna with a port number of 1 for the resource element B is $S_3$,
   channel values for the resource element A and the resource element B are deemed identical and denoted as $H_{i,j}$, i, j∈{0, 1}, where i, j represent the port number of the transmit antenna and the port number of the receive antenna respectively;
   the equation for estimating channel values is as follows:

$$\begin{bmatrix} y_0 \\ y_1 \\ y_2 \\ y_3 \end{bmatrix} = \begin{bmatrix} s_0 & s_1 & 0 & 0 \\ 0 & 0 & s_0 & s_1 \\ s_2 & s_3 & 0 & 0 \\ 0 & 0 & s_2 & s_3 \end{bmatrix} \begin{bmatrix} H_{00} \\ H_{10} \\ H_{01} \\ H_{11} \end{bmatrix}.$$

8. The channel estimation method of claim 7, wherein reconstructing the format of the transmitted signal in step 5) is preformed in the following manner:

performing de-precoding, demodulating, and channel decoding on the transmitted signal sequentially to obtain the information source, and performing channel coding, modulating, and pre-coding on the information source sequentially to finally obtain the reconstructed transmitted signal.

9. The channel estimation method of claim 8, wherein calculating the channel value for the resource element in step 5) is calculated by substituting the reconstructed transmitted signal and the received signal into the equation for estimating channel values.

10. The channel estimation method of claim 9, wherein if the equation for estimating channel values with respect to channel values for the resource elements in a pair of resource elements is unsolvable, the channel values on the pair of resource elements are temporarily denoted as N/A.

11. The channel estimation method of claim 9, wherein during repeating step 5), the previously obtained combined channel value is replaced successively by the currently obtained combined channel value, and only the combined channel value obtained in the last iteration is saved.

12. The channel estimation method of claim 11, wherein the method for converting the calculated channel value for the resource element into a combined channel value in step 5) is as follows:

traversing all resource elements of the transmitted signal, determining which one or two pairs of resource elements each resource element belongs to, and calculating the combined channel value on each resource element in the following five situations:

if the resource element belongs to two different pairs of resource elements, and if, when channel values for the resource element are solved by applying the equation for estimating channel values to these two pairs of resource elements respectively, neither of channel values for the resource element is N/A, the average of the solved values is taken as the combined channel value for the resource element;

if the resource element belongs to two different pairs of resource elements, and if, when channel values for the resource element are solved by applying the equation for estimating channel values to these two pairs of resource elements respectively, one of channel values for the resource element is N/A and the other is not N/A, the channel value which is not N/A is taken as the combined channel value for the resource element;

if the resource element belongs to two different pairs of resource elements, and if, when channel values for the resource element are solved by applying the equation for estimating channel values to these two pairs of resource elements respectively, both channel values for the resource element are N/A, the combined channel value obtained in the previous iteration is taken as the combined channel value for the resource element;

if the resource element belongs to a pair of resource elements, and if, when channel values for the resource element are solved by applying the equation for estimating channel values to the pair of resource elements, the channel value for the resource element is N/A, the combined channel value obtained in the previous iteration is taken as the combined channel value for the resource element;

if the resource element belongs to a pair of resource elements, and if, when channel values for the resource element are solved by applying the equation for estimating channel values to the pair of resource elements, the channel value for the resource element is not N/A, the solved channel value is taken as the combined channel value for the resource element.

13. The channel estimation method of claim 2, wherein said plurality of pilot signals are generated pseudo randomly in accordance with the structure of the transmitted signal, each pilot signal has a pilot frequency pattern and a pilot frequency magnitude, where the pilot frequency pattern is the position distribution of the pilot signal in the time-frequency two-dimensional plane, the pilot frequency magnitude is a complex symbol magnitude of the pilot signal.

* * * * *